Feb. 27, 1951        L. P. EVANS        2,543,005
METHOD FOR CONDUCTING HIGH-TEMPERATURE CONVERSIONS
Filed March 18, 1947        2 Sheets-Sheet 1
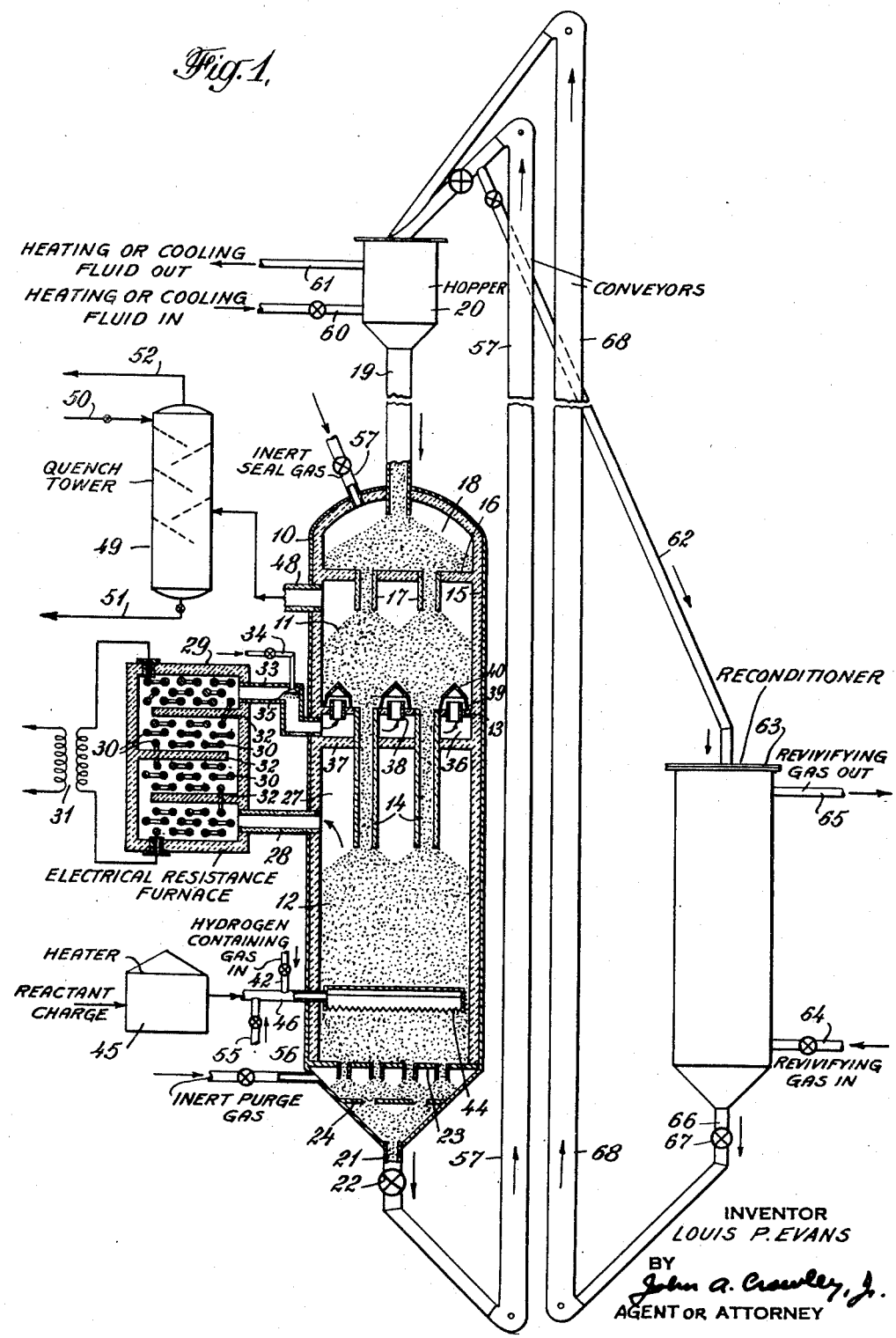
INVENTOR
LOUIS P. EVANS

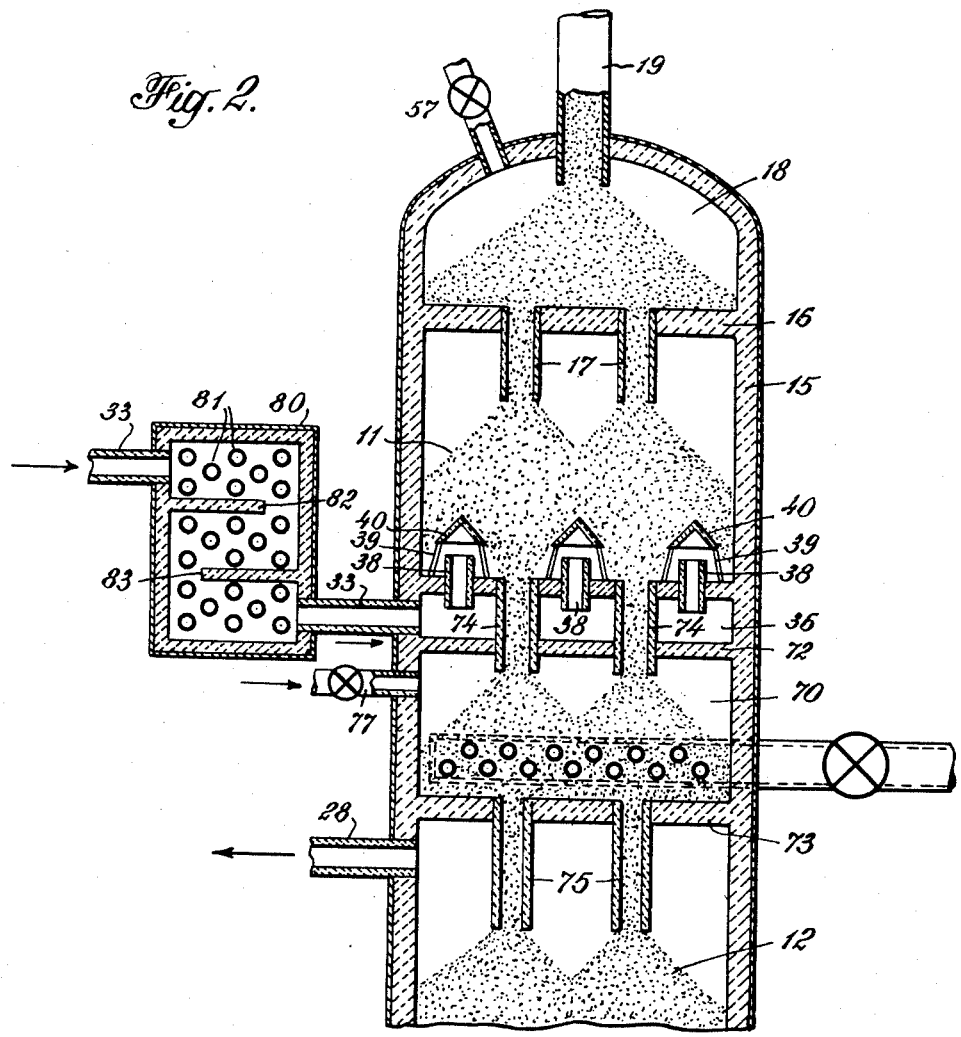

Patented Feb. 27, 1951

2,543,005

UNITED STATES PATENT OFFICE 2,543,005

METHOD FOR CONDUCTING HIGH-TEMPERATURE CONVERSIONS

Louis P. Evans, Woodbury, N. J., assignor to Socony-Vacuum Oil Company, Incorporated, a corporation of New York Application March 18, 1947, Serial No. 735,463

9 Claims. (Cl. 260—679)

1

This invention pertains to processes for conducting high temperature thermal conversions of gaseous material. This invention is particularly concerned with conversions wherein the reaction product is highly unstable under the elevated temperatures involved and requires quick cooling to prevent decomposition or polymerization thereof. Exemplary of such processes is the high temperature conversion of methane, propane and other light hydrocarbons to acetylene at temperatures of the order of 2300° F. Another process is the pyrolytic dehydrogenation of unsaturated $C_2$ and $C_3$ hydrocarbons to diolefins at temperatures of the order of 1400° F. to 1500° F. Another process is the pyrolytic cracking conversion of saturated light hydrocarbons such as ethane and butane to ethylene and hydrogen at temperatures of the order of 1300° F. to 1750° F.

Several practical difficulties arise in attempting to conduct such processes as enumerated hereinabove. The temperatures required for the reactions are very high, the amount of heat absorbed by the endothermic reaction is very great and the reaction products must be quickly cooled after formation in order to prevent decomposition. It is therefore necessary that the rate of heat input be very rapid and this in turn requires the largest possible excess of temperature in the source of heat above the temperature of formation and a large total of available heat relative to the volume of the gas receiving it. The passage of reactant gases through externally heated tubes is believed to be uneconomical commercially because of the low heat transfer rates and impractical commercially at temperatures above about 1500° F. because of the difficulty of providing metal tubes which will withstand the very high temperature levels involved. The use of refractory checker work furnaces heated by carbonaceous fuels is undesirable because such a process must be conducted intermittently or batch-wise, or if conducted continuously, the reaction products are diluted with large volumes of combustion gases causing trouble in the cooling and fractionation equipment. A properly designed electrically heated furnace is particularly well adapted as a reaction chamber for such high temperature reactions but such a reactor has not been heretofore practical because of the excessive cost involved in heating the reactant gas to the reaction temperature. Also in such a process a very difficult problem arises as to how to quench the reaction products quickly and economically while avoiding coking difficulties in long product transfer lines.

2

A major object of this invention is the provision of an improved practical process for conducting gaseous conversions of the type requiring very high temperatures and rapid quenching of the reaction products.

Another object of this invention is the provision of a practical and economical continuous process for conversion of hydrocarbons in electrically heated zones.

A specific object of this invention is the provision of a practical and economical continuous process for the production of acetylene from hydrocarbon gases at high temperatures.

Another specific object is the provision of a continuous process for the pyrolytic conversion of gaseous hydrocarbons to ethylene.

Still another object is the provision of a continuous pyrolytic process for the formation of butadiene from hydrocarbon gases.

These and other objects of this invention will become apparent from the following discussion thereof.

In one form of this invention an inert refractive contact material of particle-form is passed as a substantially compact column downwardly in series through a quenching zone wherein it acts as a quench medium for gaseous reaction products and through a gas preheating zone wherein it is cooled while providing preheat for gaseous reactant feed passing countercurrently therethrough. The cooled contact material is then returned by a suitable conveyor to the quenching zone. Gaseous hydrocarbon feed after being preheated by contact with the solid material in said preheating zone to a temperature below but near the desired reaction temperature is then passed through an electrically heated reaction zone wherein the desired conversion is effected. The reaction products then immediately pass into the moving column of solids in said quenching zone to be quickly cooled to a temperature at which the products are stable. The cooled products are then withdrawn from the upper section of the quenching zone and passed to a suitable fractionator and finishing system. The desired temperatures may be constantly maintained throughout the system by control of the inlet temperature of the reactant feed to the preheating zone, by control of the rate of solid flow and by virtue of a partial quench of the reaction products between the reaction zone and the solid quenching zone by means of a suitable quenching fluid. The partial quench of reaction products also permits accurate control of the amount of preheating given to the reactant feed. It should be understood that the words "gas" and "gaseous" are employed herein in a broad sense as meaning materials in the gaseous phase under the particular conditions of temperature and pressure involved regardless of the normal phase of that material under ordinary atmospheric conditions.

The invention may be most readily understood by reference to the drawings attached hereto, of which Figure 1 is an elevational view, partially in section, of an apparatus arrangement for carrying out the process of this invention; and Figure 2 is an elevational view, partially in section, of a modified portion of the apparatus of Figure 1.

Both of these drawings are highly diagrammatic in form.

Turning now to Figure 1, we find a vertical vessel 10 which is divided into a quench chamber 11 and a preheating chamber 12 by means of a horizontal partition 13 positioned across said vessel at an intermediate level. Tubes 14 extend downwardly from partition 13 for solid flow from the quench chamber to the preheating chamber. The length and diameter of the tubes 14 are such as will prevent substantial gas flow between the quench and preheating chambers. A second horizontal partition 16 is positioned within the upper section of vessel 10 to provide a seal chamber 18 above and in solid flow communication through tubes 17, with the quench chamber 11. The vessel 10 is suitably lined with a refractory material 15 capable of withstanding temperatures of the order of 1500-3000° F. The partitions 13 and 16 and tubes 14 and 17 are also constructed of refractory material. Exemplary of such refractories are fused alumina, zirconia, chromite, or other types of highly refractory materials.

A gravity feed leg 19 is connected between a supply hopper 20 and the seal chamber 18. A solid drain conduit 21 bearing flow control valve 22 is connected on the conical shaped bottom of vessel 10. Spaced partitions 23 and 24 provided with properly distributed tubes 25 and orifices 26 respectively are provided in the lower section of vessel 10 in order to provide for uniform withdrawal of contact material from all parts of the vessel cross-sectional area. This solid flow control arrangement is described and claimed in United States patent application Serial Number 473,861, filed January 28, 1943, now Patent No. 2,412,136, in which applicant is one of the inventors. An inverted gas distributing trough 44 is provided within the lower section of chamber 12. This trough is supplied with reactant gas from heater 45 through conduit 46. It will be understood that in large installations a number of such distributing troughs horizontally spaced apart may be employed. Other gas inlet distributing arrangements common in the art may be substituted for that shown.

The preheated reactant gas may be passed from the gas space 27 provided in the upper section of chamber 12 by tubes 14 through a refractory lined conduit 28 to an electrical resistance furnace 29. A number of resistance bars 30 constructed of graphite carbon, tungsten or other suitable material extend across the furnace 29 in a direction perpendicular to the drawing. These bars may be connected in parallel or in series as shown to a source of electric supply through a transformer 31. A system of refractory baffles 32 are provided in the furnace 29 to form a tortuous gas passageway. Further baffles or even lumps of refractory material may be provided in the furnace 29 to increase the heating surface area which will be contacted by the gas flowing through the furnace. The reaction products are withdrawn from furnace 29 through refractory lined conduit 33 wherein they are partially quenched by a suitable fluid introduced through pipe 34 and spray device 35. The gaseous products are directed by conduit 33 into the gas distributing space 36 provided by partition 13 and a horizontal partition 37 spaced below partition 13 through which tubes 14 snugly slide. A number of uniformly distributed nozzles 38 fitted vertically through partition 13 provide passages for gas flow from space 36 into the quench chamber 11. Inverted hollow conical members 40, constructed of refractory material and supported above the nozzles 38 by means of rods 39 or other suitable means serve to distribute the gas flow into the column of solids in chamber 11 and to deflect the solid flow away from nozzles 38.

As an example of the operation of the apparatus, its application to a process for conversion of hydrocarbon gases such as methane, ethane, ethylene, propane or butane, for example, to acetylene may be studied. If desired the charging stock may also consist of higher boiling hydrocarbons such as naphthas or gas oil, etc. A dilution gas such as hydrogen or an oxide of carbon may be charged simultaneously with the hydrocarbon feed. In this process the reaction temperature required may range from about 1800° F. to 3000° F. depending on the charge. When the charge is methane reaction temperatures of the order of 2300° F. and upwards are desirable. The pressure should be as low as possible, preferably atmospheric or below. The hydrocarbon feed is heated to a suitable inlet temperature, for example 500° F. in heater 45 and is then passed through conduit 46 alone or in admixture with hydrogen containing gas or an oxide of carbon introduced at 42 into the distributing trough 44 in chamber 12. The gaseous reactants pass upwardly through the column of inert solid particles in chamber 12 and become preheated to a temperature below but approaching the desired reaction temperature. For example, in the case of the conversion of methane to acetylene when the furnace 29 is maintained at temperatures above about 2300° F., the reactant feed may be preheated to about 1800-2100° F. or somewhat higher in chamber 12. The preheated gas at 2000° F. for example then passes via conduit 28 into the furnace 29 wherein it is converted to an acetylene containing gaseous product which is withdrawn from the reaction zone through conduit 33. The products may be subjected to a partial quench by means of a suitable quench fluid, preferably water introduced at 34. The purpose of the partial quench in conduit 33 is to cool the gaseous products to a temperature approximating the temperature of the preheated reactant feed entering furnace 29. In this manner the temperature of the solid material passing from chamber 11 to chamber 12 may be controlled at the desired maximum level of reactant feed preheat. This provision is of considerable importance because of the necessity for accurately controlling the amount of time at which the reactant gas exists at the desired reaction temperature. Too long a reactant residence time at the reaction temperature results in decomposition and polymerization of the desired products. In general it is desirable to maintain the maximum feed preheat temperature in the preheating zone 12 below but within about 300° F. of the minimum desired reaction temperature and preferably about 100° F. therebelow. In the present example the gaseous products may enter the space 36 at about 2000° F. and pass upwardly through nozzles 38 into the column of solids in chamber 11. Due to the very high rate of heat exchange obtainable by direct contact of solids and gases in this manner, the gaseous products are quickly quenched to a suitable temperature at which the desired product is stable. In the case of acetylene, the products should be quenched below about 700° F. In operations wherein ethylene is the desired product the quench temperature should be below about 700° F. and for a butadiene product the quench temperature should be below about 400° F. In the present example the gaseous products may be cooled to about 500° F. by the time they reach the outlet 48 from the upper section of chamber 11. The gaseous products then pass to a tower 49 where they are further quenched by means of water or oil introduced at 50. Condensed products are withdrawn from tower 49 at 51 and acetylene and other lower boiling products are withdrawn at 52. In many cases additional quenching is unnecessary and the gaseous products from chamber 11 may be passed directly to a suitable fractionator or absorption system. Particle-form contact material at a temperature of about 500° F., in the above example, enters the seal chamber 18 from hopper 20 via gravity feed leg 19. A seal gas such as steam or flue gas may be introduced into chamber 18 through conduit 57 at a sufficient rate to maintain a pressure in chamber 18 slightly above that in quench chamber 11. The contact material passes downwardly through tubes 17 into chamber 11 and then downwardly through chamber 11 as a substantially compact column and at a rate so controlled by valve 22 that upon reaching the bottom of chamber 11, the solid material has been heated by the gaseous reaction products to about 2000° F. The contact material then flows through chamber 12 wherein it may be cooled to about 510° F. by the gaseous feed. By virtue of the fact that the gaseous reactants are caused to be converted in a separate electrically heated reaction zone instead of in the presence of the moving contact material, the formation of carbonaceous deposits upon the contact material is limited to a minimum and in many operations substantially entirely avoided. Hence, in many operations the contact material from the preheating zone may be transferred by conveyor 57 directly back to hopper 20 without the necessity for its passage through a reconditioning zone. In order to further limit the amount of carbon deposited upon the contact material and to limit carbon formation in the separate reaction zone, steam may be introduced to the system either at 55 on conduit 46, or at the purge gas inlet 56, or at both locations, or at other suitable locations. The conveyor 57 may be any of a number of types adapted for conveying solid particles without crushing the same, for example, a continuous bucket elevator.

In order to obtain proper thermal balances or for operational reasons, it may be, in some cases, desirable to charge the contact material into quench zone 11 at a somewhat higher or lower temperature than that at which it passes from the preheating zone 12. In order to permit minor adjustments in the contact material temperature a suitable heating or cooling fluid may be passed through the bed of contact material maintained in hopper 20. Such fluid may be introduced to hopper 20 at 60 and withdrawn at 61, and desired indirect heat transfer may be substituted for direct heat exchange in the hopper 20. When the use of steam in the reactant charge is not desirable and for operations where there is a gradual accumulation of carbonaceous material on the contact material it is desirable to pass all or a portion of the contact material from the preheating chamber 12 via conveyor 57 and conduit 62 to the reconditioner 63. In the modification shown, the reconditioner is in the form of a vertical burning chamber through which the contact material may flow as a substantially compact column. Combustion supporting gas introduced at 64 passes upwardly through vessel 63 in contact with the solid particles so as to burn off the carbonaceous deposits. Flue gas is withdrawn at 65. The contact material then passes from the vessel 63 through conduit 66 at a rate controlled by valve 67. The contact material is conducted by conveyor 68 to hopper 20 where its temperature may be adjusted to the desired level. Other types of reconditioners may be substituted for that shown in Figure 1. For example, where it is desirable to recover as a by-product the carbon black deposited on the solid heat transfer material, it may be passed through a shaker or mill adapted to knock off the carbon black and then through a screening operation wherein it is separated from the carbon black and returned to hopper 20.

The solid heat transfer material employed in this process is a refractory material which may take the form of a metal oxide, carbide or metal capable of withstanding high temperatures of the order of 2000 to 3000° F. without fusion. Calcium, magnesium and aluminum oxides, corundum, and Carborundum are examples. For some operations carbon in the form of graphite may be employed. Tungsten is an example of a suitable metal. The solid contact material should consist of granules, pellets, spheres, etc. having an average diameter within the range about $\frac{1}{32}$ inch to 1 inch. Preferably particles having an average diameter of about ¼ to ½ inch should be employed.

In operations requiring the use of a burning chamber to remove carbonaceous contaminants from the solid particles, the temperature of the contact material entering chamber 11 and leaving chamber 12 may be maintained sufficiently high for contaminant ignition when the contact material enters chambers 63. For example, in the above described process for manufacture of acetylene the solid material may discharge from chamber 12 at about 700° F. In operations where the desired reaction product quench temperature requires lower solid inlet temperature to the quench chamber, either of two procedures may be followed. In one procedure, for example, the contact material may enter quench chamber 11 at 400° F. but be withdrawn from chamber 12 at 700–750° F. The additional heat required to balance the system may be provided by heater 45, i. e. the reactant charge may enter chamber 12 at about 750° F. In the other procedure the solid material may be withdrawn from chamber 12 at 400° F., for example, and then be subjected to a preheating in conventional equipment before being charged to the burning chamber. In the case of any of these modified operation procedures, the temperature of the preheated gaseous feed entering furnace 29 from chamber 12 may be accurately and easily controlled by adjustment in the amount of partial quenching accomplished in furnace discharge conduit 33. It will be understood that in some cases the form of conduit 33 at the location of the partial quenching zone may vary widely from that diagrammatically shown in the drawing. In many operations the reactant feed may enter chamber 12 without need of any preliminary heating at all, permitting the omission of heater 45.

From the above it will be apparent that the method of this invention provides an economical and highly flexible and practical method for conducting high temperature reactions. The unstable gaseous products formed in furnace 29 are quickly and effectively quenched by direct contact with the solid heat transfer material in chamber 11. The heat recovered from the quenched products is then used entirely for pre-heating reactant products in chamber 12 thereby effecting a very substantial saving both in cooling load and in heating load. The principal objection to electrically heated reaction zones is thereby eliminated permitting the concentration of substantially all the electrical heating energy for accomplishing the reaction and supplying the endothermic heat of reaction rather than for preheating purposes. This type of operation permits accurate control of the reactant residence time at the reaction temperatures. Moreover, by use of electrical energy to supply the heat of endothermic reactions in a separate reaction zone positioned at a central point along the path of flow of gas through the moving solid contact material, i. e. between the preheating and quenching chamber, it becomes possible to introduce contact material into chamber 11 at a relatively low temperature and to remove it from chamber 12 at about the same low temperature while still employing the contact material at very high temperatures at intermediate points in chambers 11 and 12. This feature permits the use of conventional conveyor equipment for transferring the solid material between chambers even though the reactions involved require temperatures far above those at which conveyor equipment can be practically operated. By the use of electrical heating furnace 29 in this combined apparatus the above advantage has been attained without the dilution of reaction products by combustion gases and without the use of heat transfer tubes which permit only relatively low rates of heat transfer and which will not long withstand the temperatures involved.

While the by-pass of gas around the furnace 29 via tubes 14 in the apparatus of Figure 1 may be adequately limited in most cases by careful design of the diameter and length of tubes 14, a seal zone may be provided between chambers 11 and 12 if desired. Such a modification is shown in Figure 2, where elements corresponding to like elements in Figure 1 bear like numerals. In the apparatus of Figure 2 a gas inlet chamber 36 and a seal chamber 70 are provided between the quench chamber 11 and the preheating chamber 12 by means of horizontal partitions 71 and 72 and 73 and tubes 74 and 75 depending from partitions 71 and 73, respectively. All of these elements are constructed of refractory material. A suitable seal gas such as steam may be introduced into chamber 70 through conduit 77 at a rate sufficient to create a pressure in chamber 70 slightly above the pressures in both chambers 11 and 12 thereby preventing the interflow of any reactants between said chambers except via furnace 29 shown in Figure 1.

In some operations in which the required conversion temperatures are not so excessive as to preclude practical use of heat transfer tubes due to tube failure, the important preliminary quenching step wherein the reaction products are partially quenched before introduction to the solid bed quenching zone 11, may be conducted by means of heat transfer tubes instead of the introduction of a liquid quench medium into the stream of reaction products. An arrangement permitting such operation is shown in Figure 2 wherein a cooler 80 is inserted in transfer pipe 33 leading products from the electrically heated reaction zone into space 36 leading to the quench zone 11. Suitable heat transfer tubes 81 which are supplied with a heat exchange fluid on one end from a manifold (not shown) and from the other end of which the heat exchange fluid may be withdrawn through a second manifold, (not shown) extend horizontally across the insulated cooler 80. Baffles 82 and 83 cause the gaseous reaction products to take a tortuous passage through the cooler. It should be understood that this modification is a less preferred form of the invention and cannot be satisfactorily employed by all in many high temperature operations wherein the reaction temperature is excessive.

In still another modification of this invention, cooling tubes may be positioned in that portion of chamber 70 of Figure 2 occupied by the solid material column or in the lower section of chamber 11 (the lower ⅓ of the length of chamber 11, for example) to take the place of the liquid quench introduction into line 34. Suitable manifold means may be provided to introduce and withdraw the cooling fluid into these tubes, and the rate of cooling may be controlled so as to control the temperature of the solid material flowing to preheating chamber 12 to the desired hydrocarbon charge preheat temperature. Such tubes are shown at 90 in Figure 2 fluid inlet along with heat exchange manifold at 91. If the cooling tubes are provided in the lower portion of quench chamber 11, the solid material in that portion of the length of the quench chamber occupied by the cooling tubes may be controlled at a level substantially below the reaction temperature in reactor 29 so as to provide a very high reactant initial quench rate.

It should be understood that the construction of the electrically heated reaction furnace 29 described hereinabove may be varied considerably from the form shown as will be readily understood by those skilled in the art. It is further contemplated that instead of supplying heat to the separate furnace 29 by means of electrical resistance heaters, the heat may be supplied by electrical induction. For example the furnace 29 may be provided within with a large number of refractory baffles having a high heat capacity and a high electrical conductivity. Suitable induction coils may surround the baffles or the furnace and high frequency alternating currents may be passed through said coils so as to heat the refractory baffles by induction. Heat of reaction is transferred from the heated baffles to the reactant vapors passing around and contacting said heated baffles. Alternatively beds of particle-form inert, refractory solids having high electrical conductivity may be packed into the separate reaction zone and the bed may be heated by electrical conduction. The gaseous reactants from the preheating zone 12 pass through the heated refractory bed and undergo the desired conversion.

It will be understood that the particular conditions of operating temperature, pressure and reactant residence time at the conversion temperature will vary depending upon the particular reaction and reactants involved. As an example in the conversion of methane to acetylene a residence time of about 0.0001–1.0 second within the temperature range 2300° F.–3000° F. and pressures of substantially atmospheric and lower is desirable. When the methane is diluted with hydrogen or steam somewhat longer residence times up to 5–8 seconds are permissible. The amount of hydrogen and/or steam added with the feed may vary from about 3 to 40 mols per mol of hydrocarbon introduced. Somewhat lower temperatures may be employed for the conversion of higher molecular weight hydrocarbons to acetylene. For example, temperatures of the order of 1800 to 2300° F. are suitable for conversion of ethane to acetylene. In another example butadiene may be obtained by pyrolytic conversion of unsaturated $C_2$ and $C_3$ hydrocarbons at about 1450–1600° F. and about atmospheric pressure at residence times of the order of $1/10$ to 2 seconds. On the other hand naphtha cuts may be converted to butadiene containing products at temperatures of the order of 1300 to 1600° F. with a residence period of about .005–1 second. In the case of a butadiene containing product, the gaseous products should be quenched rapidly to a temperature below about 400° F. In another example olefins may be prepared from butane or propane by pyrolytic conversion at approximately atmospheric pressure and 1250–1750° F. At about 1550° F. of the order .002 minute residence time is suitable.

It will be understood that the examples of apparatus construction and operation and of applications of this invention given hereinabove are intended as illustrative and should not be construed as limiting the scope of this invention except as it may be limited by the following claims.

I claim:

1. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through a preheating zone to heat it to a temperature within about 300° F. but below the suitable reaction temperature, passing the preheated reactant directly to and through a confined reaction zone to effect conversion thereof at said suitable reaction temperatures, heating said reaction zone electrically to maintain its temperature and to supply the endothermic heat for the reaction, mixing a suitable liquid quenching medium with the gaseous reaction products passing from said reaction zone to partially quench the products to a temperature below the reaction temperature but within about 300° F. thereof, passing the partially quenched gaseous products through a cooler moving bed of refractive particle-form contact material in a confined quench zone to quench said gaseous products to a temperature at which the products are substantially stable, withdrawing quenched gaseous products from said quench zone, passing a particle-form refractive contact material through a plurality of zones in series the first of which is said quench zone wherein it moves as a compact bed countercurrently to said gaseous products to be heated to a temperature within about 300° F. of but below the suitable gaseous reactant conversion temperature, and the last of which is said preheating zone wherein it moves countercurrently to the gaseous reactant charge to preheat said charge and to be cooled by the incoming gaseous reactant from a temperature within about 300° F. of said reaction temperatures to a temperature approximating the desired gaseous product quench temperature, withdrawing contact material from said preheating zone and passing it to said quench zone as the contact material supply thereto.

2. The method for conducting endothermic conversions of gaseous hydrocarbons at suitable elevated reaction temperatures to form gaseous hydrocarbon products which are unstable at said reaction temperatures which comprises: passing gaseous hydrocarbon reactant through a preheating zone to heat it to a temperature within about 300° F. but below the suitable reaction temperature, passing the preheated reactant from said preheating zone directly to a reaction zone without further outside heating and passing it through said confined reaction zone to effect conversion thereof at said suitable reaction temperatures, heating said reaction zone electrically to maintain its temperature and to supply the endothermic heat for the reaction, passing gaseous reaction products from said reaction zone into a moving bed of particle-form refractive contact material in a confined quench zone to quench said gaseous products to a temperature at which the products are substantially stable, withdrawing quenched gaseous products from said quench zone, passing a particle-form refractive contact material through a plurality of zones in series the first of which is said quench zone wherein it moves as a compact bed countercurrently to said gaseous products to be heated thereby, and the last of which is said preheating zone wherein it moves countercurrently to the gaseous reactant charge to preheat said charge and to be cooled by the incoming gaseous reactant, withdrawing contact material from said preheating zone and passing it to said quench zone as the contact material supply thereto, and controlling the temperature of the contact material leaving said quench zone and of the contact material entering said preheating zone at a predetermined level below but within about 300° F. of said reaction temperature by introduction of a suitable liquid quench fluid at a controlled rate.

3. A continuous process for pyrolytic conversion of gaseous hydrocarbon reactants at elevated temperatures to gaseous hydrocarbon products which are unstable at the elevated conversion temperatures which comprises: passing a refractive-type particle form contact material as a continuous substantially compact column downwardly through a confined quench zone and a confined preheating zone in series, introducing gaseous hydrocarbon reactant into the lower section of said preheating zone and passing it upwardly through said column therein to cool said contact material and to preheat said reactant to a temperature below but within about 300° F. of the suitable range of conversion temperatures, passing the preheated gaseous reactant from said preheating zone without further preheating to a separate confined reaction zone and passing it through said zone in contact with stationary electrical resistance elements, passing electric currents through said resistance elements to maintain the reaction temperature in said reaction zone and to supply the endothermic heat for the hydrocarbon conversion, subjecting the gaseous conversion products passing from said reaction zone to a spray of a suitable liquid quenching fluid to cool said products to a temperature below but within about 300° F. of said suitable range of conversion temperatures, passing the conversion products upwardly through said column of contact material in said quench zone to cool the gaseous products to a suitable quench temperature which is above the condensation temperature of said gaseous products and to heat said contact material to a temperature below but within about 300° F. of said conversion temperature, withdrawing quenched gaseous products from said quench zone, withdrawing cooled contact material from said preheating zone at a controlled rate while controlling its discharge temperature substantially equal to said suitable gaseous product quench temperature by adjustment of the inlet temperature of said gaseous reactant introduced into said preheating zone and returning the cooled contact material to the upper section of said quench zone.

4. A continuous process for pyrolytic conversion of gaseous hydrocarbon reactants at elevated temperatures to gaseous hydrocarbon products which are unstable at the elevated conversion temperatures which comprises: passing a refractive-type particle form contact material as a continuous substantially compact column downwardly through a confined quench zone and a confined preheating zone in series, introducing gaseous hydrocarbon reactant into the lower section of said preheating zone and passing it upwardly through said column therein to cool said contact material and to preheat said reactant to a temperature below but within about 300° F. of the suitable range of conversion temperatures, passing the preheated gaseous reactant from said preheating zone without further preheating to a separate confined reaction zone, and passing it through said reaction zone in contact with stationary electrical resistance elements, passing electric currents through said resistance elements to maintain the reaction temperature in said reaction zone and to supply the endothermic heat for the hydrocarbon conversion, subjecting the gaseous conversion products to a preliminary cooling whereby they are cooled to a temperature below but within about 300° F. of said suitable range of conversion temperatures, passing the conversion products upwardly through said column of contact material in said quench zone to cool the gaseous products to a suitable quench temperature which is above the condensation temperature of said gaseous products and to heat said contact material to a temperature below but within about 300° F. of said conversion temperature, withdrawing quenched gaseous products from said quench zone, withdrawing cooled contact material from said preheating zone at a controlled rate, passing at least a portion of said contact material through a reconditioning zone to remove carbonaceous deposits therefrom, adjusting the temperature of the contact material to substantially said suitable gaseous product quench temperature and introducing said contact material into the upper section of said quench zone.

5. A continuous process for pyrolytic conversion of gaseous hydrocarbon reactants at elevated temperatures to gaseous hydrocarbon products which are unstable at the elevated conversion temperatures which comprises: passing a refractive-type particle form contact material as a continuous substantially compact column downwardly through a confined quench zone, seal zone and preheating zone arranged in vertical series, introducing gaseous hydrocarbon reactant into the lower section of said preheating zone and passing it upwardly through said column therein to cool said contact material and to preheat said reactant to a temperature below but within about 300° F. of the suitable range of conversion temperatures, passing the preheated gaseous reactant from said preheating zone without further preheating to a separate confined reaction zone and passing it through said reaction zone in contact with stationary electrical resistance elements, passing electric currents through said resistance elements to maintain the reaction temperature in said reaction zone and to supply the endothermic heat for the hydrocarbon conversion, subjecting the gaseous conversion products passing from said reaction zone to a preliminary cooling whereby they are cooled to a temperature below but within about 300° F. of said suitable range of conversion temperature, passing the conversion products upwardly through said column of contact material in said quench zone to cool the gaseous products to a suitable quench temperature which is above the condensation temperature of said gaseous products and to heat said contact material to a temperature below but within about 300° F. of said conversion temperature, withdrawing quenched gaseous products from said quench zone, withdrawing cooled contact material from said preheating zone at a controlled rate and returning it to the upper section of said quench zone at approximately said suitable quench temperature for said gaseous products, and introducing a suitable seal gas into said seal zone at a sufficient rate to maintain a seal gas pressure therein above the gaseous pressure in said quench and preheating zones.

6. A continuous process for pyrolytic conversion of gaseous hydrocarbon reactants at elevated reaction temperatures comprising: passing a particle-form refractory-type contact material as a substantially compact column of moving particles through a confined gas quench zone and later through a confined gas preheating zone, introducing gaseous hydrocarbon feed into said preheating zone and passing it countercurrently to said contact material so as to preheat said feed to a temperature within about 300° F. of but below the desired conversion temperature, passing the preheated gaseous feed from said preheating zone through a separate confined heated conversion zone while supplying the heat for conversion electrically, passing the gaseous conversion products through said quench zone countercurrently to said contact material so as to cool said products to a suitable temperature substantially below the temperature in said conversion zone and so as to heat the contact material to a temperature approaching but below that in said conversion zone, withdrawing the cooled contact material from said preheating zone and returning it to said quench zone to replenish the column therein and passing a cooling fluid in heat exchange relationship with said contact material to adjust the temperature of said contact material to the desired reactant feed preheat temperature which is below said conversion temperature but within about 300° F. thereof.

7. The process of making acetylene which comprises: passing gaseous hydrocarbon reactant through a preheating zone to heat it to a temperature below but within about 300° F. of the suitable conversion temperature, passing the preheated reactant without further preheating to a confined reaction zone and passing it through said reaction zone to effect conversion thereof to acetylene containing gaseous products, heating said reaction zone electrically to maintain it at a suitable reaction temperature within the range about 1800-3000° F. and to supply the endothermic heat for the reaction, subjecting the gaseous conversion products from said reaction zone to a spray of a suitable liquid quenching fluid to cool said products to a temperature below but within about 300° F. of said suitable reaction temperature, passing the partially cooled gaseous reaction products from said reaction zone into a moving bed of particle form refractive contact material in a confined quench zone to quench said gaseous products to a temperature below about 700° F., withdrawing quenched gaseous products from said quench zone, passing a particle form refractive contact material through a plurality of zones in series the first of which is said quench zone wherein it moves as a compact bed countercurrently to said gaseous products to be heated to a temperature within about 300° F. of but below the suitable gaseous reactant conversion temperature, and the last of which is said preheating zone wherein it moves countercurrently to the gaseous reactant charge to preheat said charge and to be cooled by the incoming gaseous reactant from a temperature within about 300° F. of said reaction temperatures to a temperature approximating the desired gaseous product quench temperature, withdrawing contact material from said preheating zone and passing it to said quench zone as the contact material supply thereto.

8. A continuous process for pyrolytic conversion of substantially saturated gaseous hydrocarbons at elevated temperatures to ethylene containing products which comprises: passing gaseous saturated hydrocarbon reactant through a preheating zone to heat it to a temperature below but within about 300° F. of the suitable conversion temperature, passing the preheated reactant without further preheating to a confined reaction zone and passing it through said reaction zone, to effect conversion thereof to ethylene containing gaseous products, heating said reaction zone electrically to maintain it at a suitable reaction temperature within the range about 1300-1750° F. and to supply the endothermic heat for the reaction, introducing a liquid quenching medium into said gaseous reaction products issuing from said reaction zone to cool the same to approximately the temperature of the preheated reactant entering said reaction zone, passing the cooled gaseous reaction products from said reaction zone into a moving bed of particle-form refractive contact material in a confined quench zone to quench said gaseous products to a temperature below about 700° F., withdrawing quenched gaseous products from said quench zone, passing a particle-form refractive contact material through a plurality of zones in series, the first of which is said quench zone wherein it moves as a compact bed countercurrently to said gaseous products to be heated to a temperature within about 300° F. but below the suitable gaseous reactant conversion temperature, and the last of which is said preheating zone wherein it moves countercurrently to the gaseous reactant charge to preheat said charge and to be cooled by the incoming gaseous reactant from a temperature within about 300° F. of said reaction temperatures to a temperature approximating the desired gaseous product quench temperature, withdrawing contact material from said preheating zone and passing it to said quench zone as the contact material supply thereto.

9. A continuous process for pyrolytic conversion of gaseous hydrocarbons having more than one carbon atom per molecule at elevated temperatures to butadiene containing products which comprises: passing the gaseous reactant feed through a preheating zone to heat it to a temperature below but within about 300° F. of the suitable conversion temperature, passing the preheated reactant without further preheating to a confined reaction zone and passing it through said reaction zone, to effect conversion thereof to butadiene containing gaseous products, heating said reaction zone electrically to maintain it at a suitable reaction temperature within the range about 1300-1600° F. and to supply the endothermic heat for the reaction, withdrawing gaseous reaction products from said reaction zone and subjecting the same to a suitable liquid quench to cool them to a temperature substantially the same as that of the preheated reactant entering said reaction zone, passing the cooled gaseous reaction products from said reaction zone into a moving bed of particle-form refractive contact material in a confined quench zone to quench said gaseous product to a temperature below about 400° F., withdrawing quenched gaseous products from said quench zone, passing a particle-form refractive contact material through a plurality of zones in series, the first of which is said quench zone wherein it moves as a compact bed countercurrently to said gaseous products to be heated to a temperature within about 300° F. of but below the suitable gaseous reactant conversion temperature, and the last of which is said preheating zone wherein it moves countercurrently to the gaseous reactant charge to preheat said charge and to be cooled by the incoming gaseous reactant from a temperature within about 300° F. of said reaction temperatures to a temperature approximating the desired gaseous product quench temperature, withdrawing contact material from said preheating zone and passing it to said quench zone as the contact material supply thereto.

LOUIS P. EVANS.

REFERENCES CITED

The following references are of record in the file of this patent:

UNITED STATES PATENTS

| Number | Name | Date |
|---|---|---|
| 1,023,783 | Knapp | Apr. 16, 1912 |
| 1,065,182 | Staudinger | June 17, 1915 |
| 1,773,611 | Banck | Aug. 19, 1930 |
| 2,351,214 | Kaufmann | June 13, 1944 |
| 2,376,191 | Rotheli et al. | May 15, 1945 |
| 2,386,537 | Bibb | Oct. 9, 1945 |
| 2,387,378 | Wolk | Oct. 23, 1945 |
| 2,389,636 | Ramseyer | Nov. 27, 1945 |
| 2,398,954 | Odell | Apr. 23, 1946 |
| 2,405,395 | Bahlke et al. | Aug. 6, 1946 |
| 2,406,640 | Siecke | Aug. 27, 1946 |
| 2,443,210 | Upham | June 15, 1948 |